(12) United States Patent
Schneider (10) Patent No.: US 8,954,462 B2
(45) Date of Patent: Feb. 10, 2015

(54) FINDING RELATED SEARCH TERMS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 611 days.

(21) Appl. No.: 12/393,989

(22) Filed: Feb. 26, 2009

(65) Prior Publication Data

US 2010/0228763 A1  Sep. 9, 2010

(51) Int. Cl.
*G06F 17/30* (2006.01)
*H04L 29/08* (2006.01)

(52) U.S. Cl.
CPC .......... *G06F 17/30672* (2013.01); *H04L 67/02* (2013.01)
USPC ........................................................ 707/767

(58) Field of Classification Search
CPC .................... G06F 17/30392; G06F 17/30646; G06F 17/30657; G06F 17/30693; G06F 17/2735; G06F 17/30672; G06F 2203/0381; G06F 3/04883; G06F 3/04886
See application file for complete search history.

(56) References Cited

U.S. PATENT DOCUMENTS

| | | | |
|---|---|---|---|
| 2005/0222987 A1* | 10/2005 | Vadon ............................... | 707/3 |
| 2007/0050339 A1* | 3/2007 | Kasperski et al. ................ | 707/3 |
| 2007/0100804 A1* | 5/2007 | Cava ................................. | 707/3 |
| 2007/0244863 A1* | 10/2007 | Adams et al. .................... | 707/3 |
| 2009/0070299 A1* | 3/2009 | Parikh et al. ..................... | 707/3 |
| 2009/0112857 A1* | 4/2009 | Tong et al. ........................ | 707/5 |

* cited by examiner

*Primary Examiner* — Dinku Gebresenbet
(74) *Attorney, Agent, or Firm* — Lowenstein Sandler LLP (57) ABSTRACT

A system and method for suggesting search terms is described. The method includes receiving a search term from a client at a first time and generating one or more suggested search terms to the client based on the analysis of elapsed time data between the first time and a prior time of receiving a prior search terms. The method further includes sending the suggested search terms to the client.

12 Claims, 7 Drawing Sheets

FINDING RELATED SEARCH TERMS

TECHNICAL FIELD

Embodiments of the present invention relate to computing systems, and more particularly, to a method and apparatus for suggesting related search terms.

BACKGROUND

With the increasing popularity of the Internet and the World Wide Web, it is common for on-line users to utilize search engines to search the Internet for desired information. In order to perform a search, a user submits a query containing one or more query terms. A query server program of the search engine processes the query to identify any items that match the terms of the query. The set of items identified by the query server program is referred to as a "query result." In web-based implementations, the query result is typically presented to the user as a hypertextual listing of the located items.

However such queries may not be actual representation of what the user meant to search. As such, the process of parsing from one web site to another web site consumes significant time to the user, and increases the amount of time the user must spend before reaching a web site relevant to his/her query.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for suggesting related search terms is described. A server receives a search term from a client and generates one or more suggested search terms to the client based on an analysis of temporal data between prior search terms in relation to the search term. The server sends the suggested search terms to the client.

Figure 1:
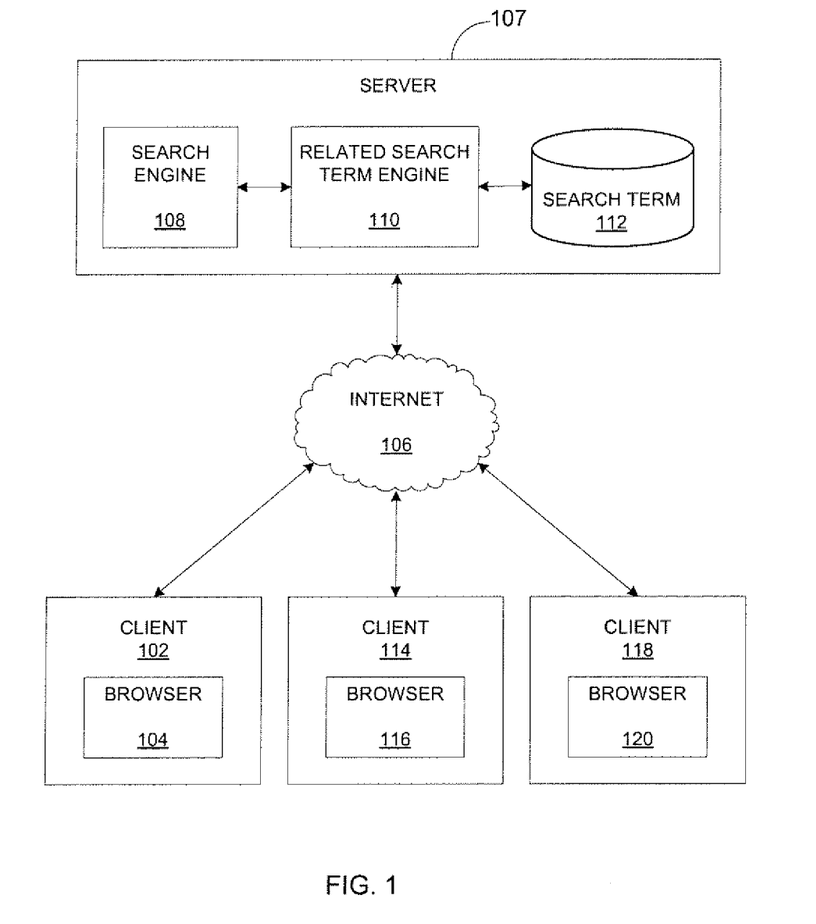
FIG. 1 is a block diagram illustrating one embodiment of a system for analyzing and suggesting related search terms.

FIG. 1 is a block diagram illustrating one embodiment of a system for analyzing and suggesting related search terms. The system includes a server 107 communicating with clients 102, 114, and 118 via a network 106, such as the Internet.

Client 102, 114, and 118 respectively include a web browser 104, 116, and 120. A user who is searching for a particular subject may wind up entering several search terms in an effort to find the information he/she is seeking. This behavior can be used to provide either suggestions for other terms to search for, and/or to improve organic search results directly. In one embodiment, a search term may include one or more words. A user enters a search term in web browser 104 of client 102. The search term is communicated to server 107.

In one embodiment, server 107 includes a search engine 108 configured to search web pages and documents based on the submitted search term. Related search term 110 captures the submitted search term along with other temporal data, and stores the related search terms in storage device 112. Related search term engine 110 serves two purposes: one is to collect and analyze the data from clients 102, 114, 118, two is to suggest related search terms in response to the submitted search term from each client.

In accordance with another embodiment, related search term engine 110 is located in another server distinct from server 107.

For data collection and analysis, in one embodiment, related search term engine 110 examines a temporal data such as the elapse time between a first search term submitted in the web browser 104 and a subsequent search term submitted in the web browser 104 within the same browsing session. A browsing session may start from the opening of the web browser to the closing of the web browser. For example, a high relatedness exists between term T1 and term T2 when a person searches for the term T1, then immediately thereafter searches for the term T2. This can be transitive: a person who searches for T1, then T2, and then T3 has a high relatedness for T1 and T2, and a high relatedness for T2 and T3, which implies a high relatedness for T1 and T3. In harnessing the behavior of the user who digs up related information, socially relevant related terms can be found. For example, if a user is interested in topic A and B, it is likely that another person who is interested in A may also be interested in B. As such, for suggesting search terms, related search term engine 110 uses the data it has collected to suggest a related search term to the user.

Figure 2:
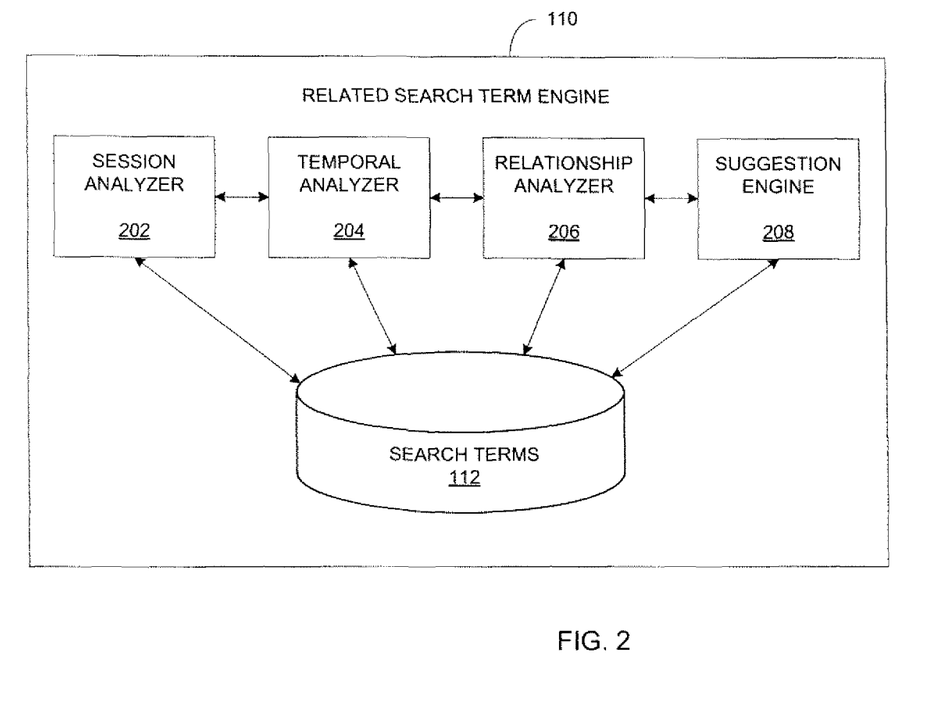
FIG. 2 is a block diagram illustrating one embodiment of a related search term engine.

FIG. 2 is a block diagram illustrating one embodiment of related search term engine 110. Related search term engine 110 includes a session analyzer module 202, a temporal analyzer module 204, a relationship analyzer module 206, a suggestion engine 208, and a storage device 112. Session analyzer module identifies a single web browsing session on a client. In one embodiment, a single web browsing session starts at the opening of a web browser and ends at the closing of the web browser. Temporal analyzer module 204 measures and analyzes an elapse time between a first search term and a second search term within the single web browsing session on the client. Relationship analyzer module 206 determines a degree of relatedness between the first search term and the second search term based on the elapse time. Storage device 112 records the degree of relatedness between the first search term and the second search term. Suggestion engine module 208 suggests one more related search terms based on the search term submitted by the client. In one embodiment, the suggested terms do not include any terms from the search term originally submitted by the client.

Temporal analyzer module 204 captures temporal data associated with a sequence of inputed search terms from the user while relationship analyzer module 206 correlates at least two search terms based on the temporal data. Storage device 112 stores related search terms based on the correlation.

Relationship analyzer module 110 adjusts a degree of relatedness of each related search term based on the correlation. In one embodiment, the degree of relatedness between the first search term and the second search term correlates with the temporal data between the first search term and the second search term.

Figure 3:
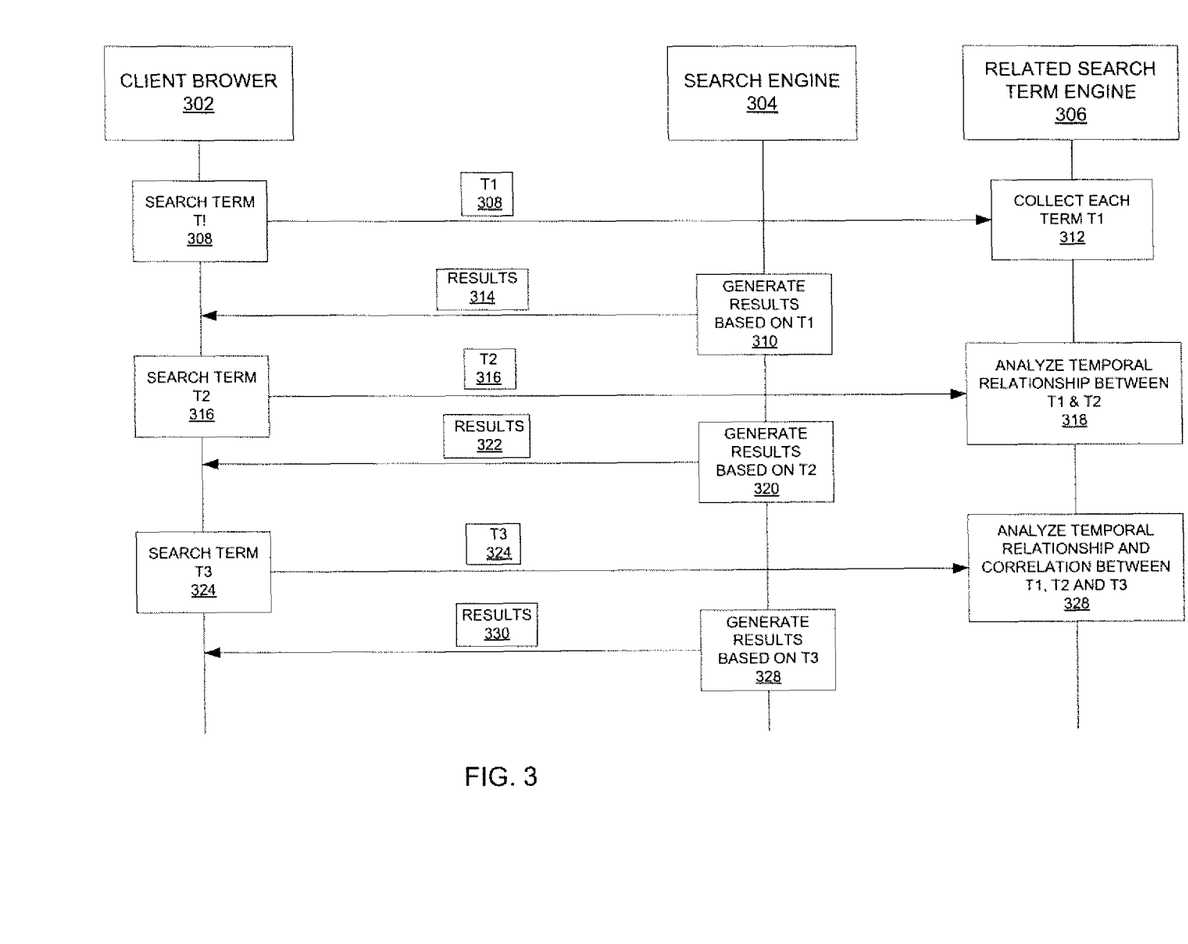
FIG. 3 is a ladder diagram illustrating one embodiment of a system for collecting and analyzing related search terms.

FIG. 3 is a ladder diagram illustrating one embodiment of a system for collecting and analyzing related search terms. A client web browser 302 communicates with a search engine 304 and a related search term engine 306. A user starts a web browser 302 application on the client and submits a search term T1 308 to search engine 304. Related search term engine 306 also captures search term T1 at 312. Search engine 304 generates search results 314 to client browser 302. The user may immediately after submit another query for a related search term T2 316 to search engine 304. Related search term engine 306 captures related search term T2, and analyzes temporal data, relationship and correlation between search term T1 and search term T2. Search engine 304 generates search results 322 based on the recently submitted search term T2 back to web browser 302.

Similarly, the user may submit another search term T3 324 if the user is not satisfied with search results 322. Related search term engine 306 analyzes temporal data, relationship and correlation between search terms T1, T2, and T3 at 326. The analysis is stored in a storage device for suggesting related search terms. Search engine 304 generates search results 330 based on the recently submitted search term T3 back to web browser 302. Thus, the behavior of the user is collected and analyzed in related search term engine 306. The above illustrates one embodiment of collecting and analyzing such data for later use.

Figure 4:
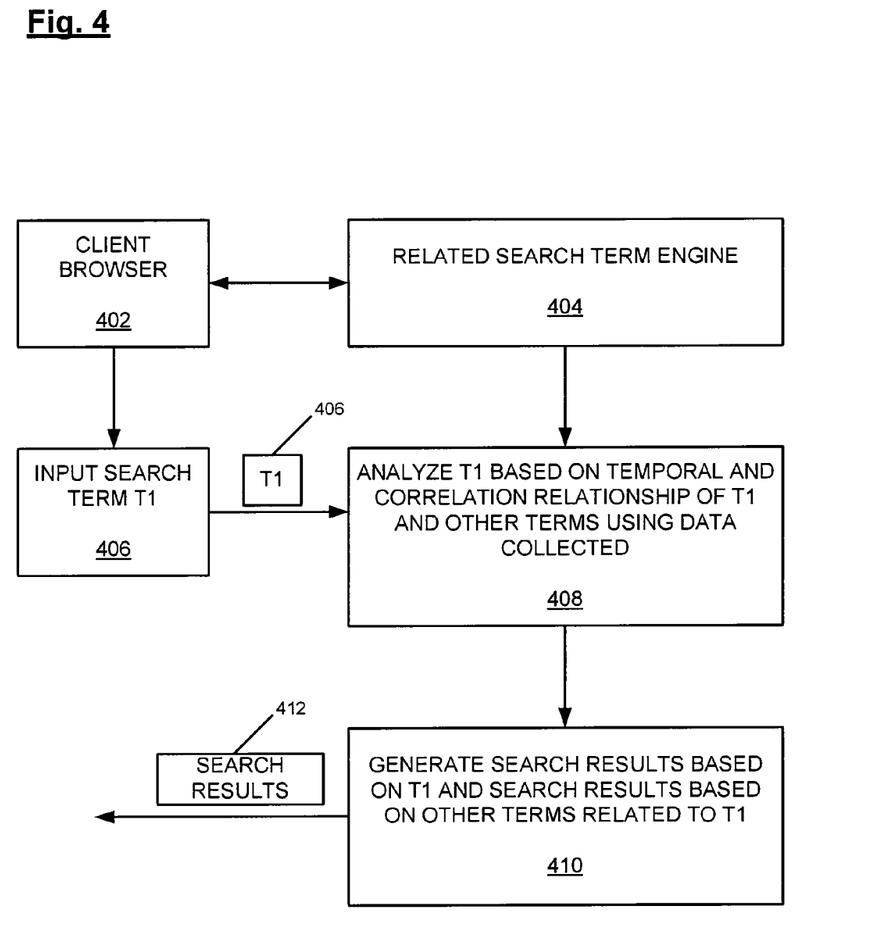
FIG. 4 is a ladder diagram illustrating one embodiment of a system for suggesting related search terms.

FIG. 4 is a ladder diagram illustrating one embodiment of a system for suggesting related search terms. Client browser 402 communicates via a network with related term search engine 404. An input search term T1 406 is submitted to related term search engine directly or indirectly. For example, a user may want to submit the search term T1 to a search engine. Related term search engine 404 captures the search term T1 and generates search results based on the search term T1 and other related terms (as determined by the related search term engine).

At 408, related term search engine 404 analyzes search term T1 based on the temporal and correlation relationship of T1 with other terms using data collected as previously described. At 410, search results are generated based on search term T1 and also based on other related search terms related to search term T1. For example, a user entering a search term such as a "cat" may receive results based on searches performed on "cat" and "feline".

Figure 5:
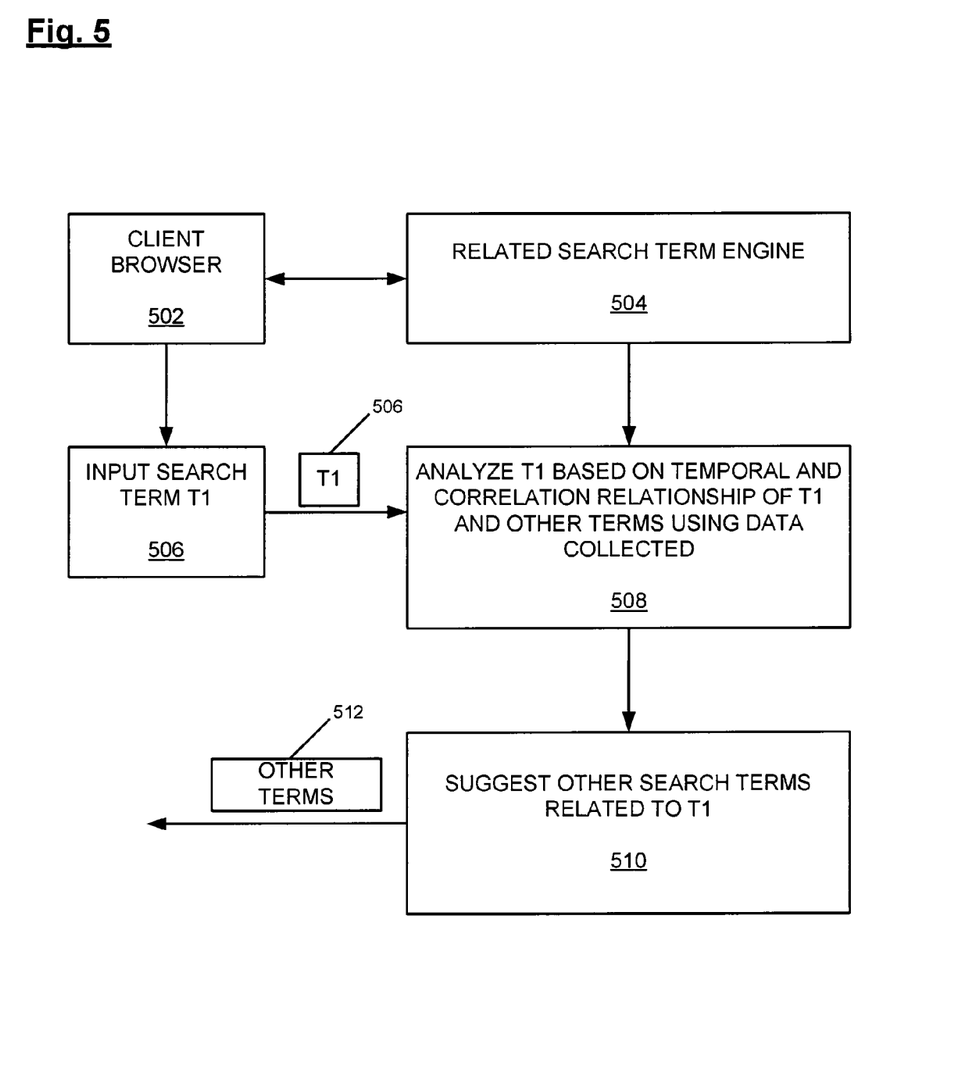
FIG. 5 is a ladder diagram illustrating an alternative embodiment of a system for suggesting related search terms.

FIG. 5 is a ladder diagram illustrating an alternative embodiment of a system for suggesting related search terms. Alternatively, the user may want to submit the search term T1 on client browser 502 directly to the related term search engine 504 to first obtain a list of related search terms that the user may want to submit later on to another search engine.

The user submits input search term T1 506 to related search term engine 504. Related search term engine 504 analyzes at 508 search term T1 based on the correlation and relationship of T1 and other related search terms collected as previously described. At 510, related search term engine 504 suggests other search terms related to T1 506 and returns the suggested terms 512 to client browser 502.

Figure 6:
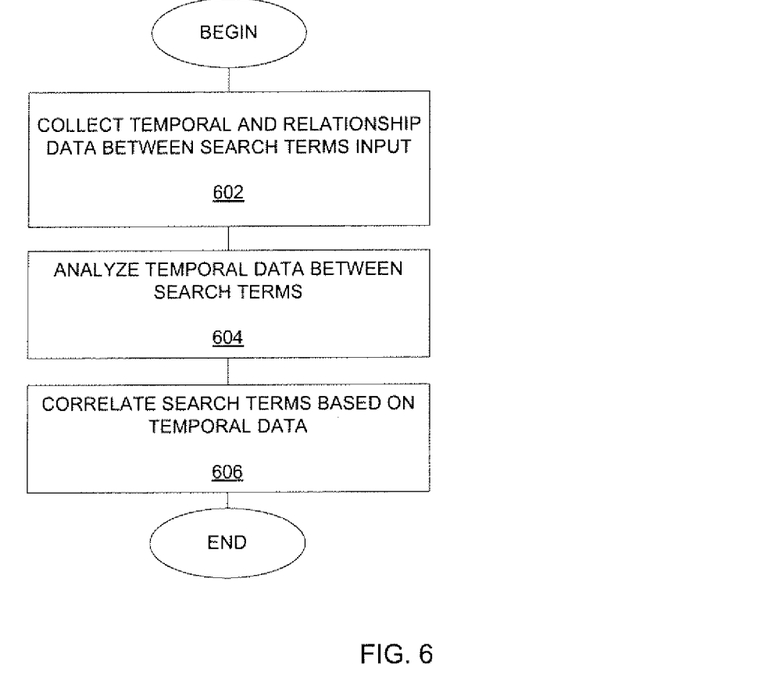
FIG. 6 is a flow diagram illustrating one embodiment of a method for collecting and analyzing related search terms.

FIG. 6 is a flow diagram illustrating one embodiment of a method for collecting and analyzing related search terms. At 602, temporal data and relationship data between search terms are collected. The search term includes one or more words. At 604, the temporal data is analyzed between search terms. At 606, search terms are correlated based on the analyzed temporal data. Related search terms are stored based on the correlation analysis.

In one embodiment, the sequence of inputed search terms is within a same web browsing session of the user on the client. In another embodiment, the sequence of inputed search terms comprises a first search term and a second search term, wherein the second search term is received from a web browser of the client from a same user directly after search results based on the first search term are displayed on the web browser.

A degree of relatedness of each related search term is adjusted based on the correlation. The degree of relatedness between a first search term and a second search term correlates with the temporal data between the first search term and the second search term.

Figure 7:
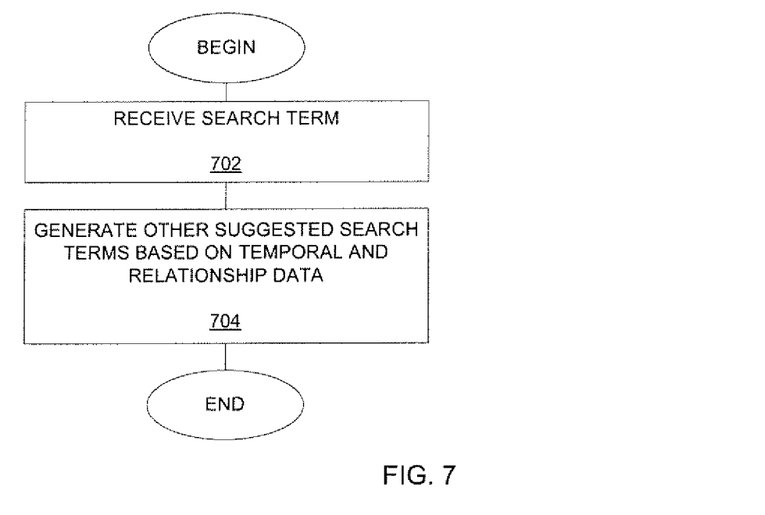
FIG. 7 is a flow diagram illustrating one embodiment of a method for suggesting related search terms.

FIG. 7 is a flow diagram illustrating one embodiment of a method for suggesting related search terms. At 702, a related term search engine receives a search term. At 704, the related term search engine generates other suggested search terms based on temporal and relationship data of previously submitted terms from the same and/or other users.

Figure 8:
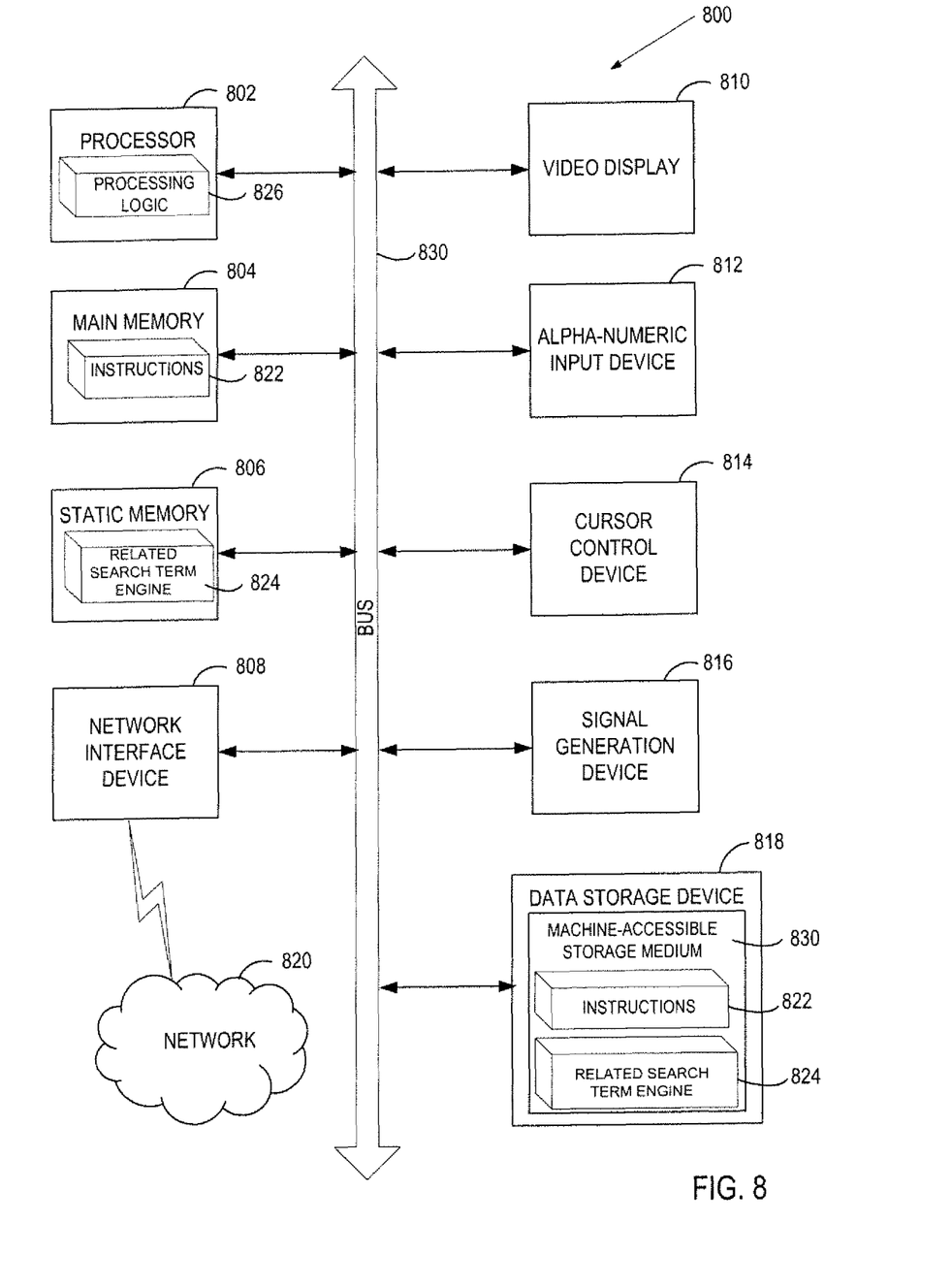
FIG. 8 is a block diagram illustrating an example of a computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device or processor 802, a main memory 804 (e.g., read-only memory (ROM), flash memory, dynamic random access memory (DRAM) such as synchronous DRAM (SDRAM), a static memory 806 (e.g., flash memory, static random access memory (SRAM) etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-accessible storage medium 830 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-accessible storage media. The software 822 may further be transmitted or received over a network 820 via the network interface device 808.

The computer-accessible storage medium 830 may also be used to store the related term search engine 824 as presently described. The related term search engine 824 may also be stored in other sections of computer system 800, such as static memory 806.

While the computer-accessible storage medium 830 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the computer system and that cause the computer system to perform any one or more of the methodologies of the present invention. The term "computer-accessible storage medium" shall accordingly be taken to include, but not be limited to, solid-state memories, optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a first search term from a first client at a first time;
   receiving a second search term from a second client at a second time, wherein the first client is different from the second client and the first time is prior to the second time;
   determining elapsed time data between the first time and the second time; determining a degree of relatedness between the first search term and the second search term in view of the elapsed time data;
   correlating the first search term with the second search term in view of the elapsed time data and the degree of relatedness;
   adjusting, the degree of relatedness between the first search term and the second search term in view of the correlation;
   analyzing, the elapsed time data, the degree of relatedness and the correlation; and
   generating, by the processing device, a search result comprising a plurality of suggested search terms in view of the analyzed elapsed time data, the degree of relatedness and the correlation between the first search term received from the first client and the second search term received from the second client;
   sending, by the processing device, the search result to the first client and the second client;
   receiving, by the processing device, a third search term from the first client in response to determining that the search result excludes the first search term received from the first client; and
   receiving, by the processing device, a fourth search term from the second client in response to determining that the search result excludes the second search term received from the second client.

2. The method of claim 1 further comprising:
capturing the elapsed time data between sequence of inputted search terms from a user;
determining the degree of relatedness between at least two search terms from the inputted search terms; and
correlating the at least two search terms in view of the elapsed time data and the degree of relatedness.

3. The method of claim 2 wherein the sequence of inputted search
terms is within a web browsing session of the user on one of the first or the second client.

4. The method of claim 3 further comprising:
storing the at least two search terms in view of the correlation.

5. A system comprising:
a processing device;
a memory coupled to the processing device to provide instructions to the processing device, and in response to the instructions, the processing device to:
receive a first search term from a first client at a first time;
receive a second search term from a second client at a second time, wherein the first client is different from the second client and the first time is prior to the second time;
determine elapsed time data between the first time and the second time;
determine a degree of relatedness between the first search term and the wi~second search term in view of the elapsed time data;
correlate the first search term with the second search term in view of the elapsed time data and the degree of relatedness;
adjust the degree of relatedness between the first search term and the pr4~second search term in view of the correlation;
analyze the elapsed time data, the degree of relatedness and the correlation; and
generate a search result comprising a plurality of suggested search terms in view of the analyzed elapsed time data, the degree of relatedness and the correlation between the first search term received from the first client and the second search term received from the second client;
send the search result to the first client and the second client;
receive a third search term from the first client in response to determining that the search result excludes the first search term received from the first client; and
receiving a fourth search term from the second client in response to determining that the search result excludes the second search term received from the second client.

6. The system of claim 5 the processing device to capture the elapsed time data between sequence of inputted search terms from the user, determine the degree of relatedness between at least two search terms from the inputted search terms and correlate the at least two search terms in view of the elapsed time data and the degree of relatedness.

7. The system of claim 6 wherein the sequence of inputted search terms is within a single web browsing session of the user on one of the first or the second client.

8. The system of claim 7 the processing device to store the at least two search terms in view of the correlation.

9. A non-transitory computer-accessible storage medium comprising data that, when accessed by a processing device, cause the processing device to perform operations comprising:
receiving a first search term from a first client at a first time;
receiving a second search term from a second client at a second time, wherein the first client is different from the second client and the first time is prior to the second time;
determining elapsed time data between the first time and the second time of; determining a degree of relatedness between the first search term and the second search term in view of the elapsed time data;
correlating the first search term with the second search term in view of the elapsed time data and the degree of relatedness;
adjusting the degree of relatedness between the first search term and the second search term in view of the correlation;
analyzing, the elapsed time data, the degree of relatedness and the correlation; and
generating, by the processing device, a search result comprising a plurality of suggested search terms in view of the analyzed elapsed time data, the degree of relatedness and the correlation between the first search term received from the first client and the second search term received from the second client;
sending, by the processing device, the search result to the first client and the second client;
receiving, by the processing device, a third search term from the first client in response to determining that the search result excludes the first search term received from the first client; and
receiving, by the processing device, a fourth search term from the second client in response to determining that the search result excludes the second search term received from the second client.

10. The non-transitory computer-accessible storage medium of claim 9 wherein the operations further comprise:
capturing the elapsed time data between sequence of inputted search terms from a user;
determining the degree of relatedness between at least two search terms from the inputted search terms; and
correlating the at least two search terms in view of the elapsed time data and the degree of relatedness.

11. The non-transitory computer-accessible storage medium of claim 10 wherein the sequence of inputted search terms is within a web browsing session of the user on one of the first or the second client.

12. The non-transitory computer-accessible storage medium of claim 11 wherein the operations further comprise:
storing the at least two search terms in view of the correlation.

* * * * *